T. GARRICK.
Eyelet.
No. 6,512. Reissued June 29, 1875.
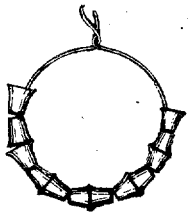
*Witnesses.*
C. A. Brown
Melville Clark
*Inventor.*
Thos. Garrick
by his Attys.
Hill & Ellsworth
THE GRAPHIC CO. PHOTO-LITH. 39 & 41 PARK PLACE, N.Y.

UNITED STATES PATENT OFFICE.

THOMAS GARRICK, OF PROVIDENCE, RHODE ISLAND, ASSIGNOR TO HENRY A. CHURCH, OF SAME PLACE.

IMPROVEMENT IN EYELETS.

Specification forming part of Letters Patent No. 104,013, dated June 7, 1870; reissue No 6,512, dated June 29, 1875; application filed July 3, 1874.

*To all whom it may concern:*

Be it known that I, THOMAS GARRICK, of the city and county of Providence, in the State of Rhode Island, have invented a new and Improved Eyelet; and I do hereby declare the following to be a full, clear, and exact description of the same, reference being had to the accompanying drawings forming part of this specification, in which the figure represents a series of eyelets constructed in accordance with my invention.

Heretofore eyelets have been almost exclusively made from brass, copper, or other metal of equal pliability, from the fact that only such soft metals could be practically wrought into the eyelet form, and that all attempts to work the harder metals—such as iron—resulted simply in punching or bursting open the metal before it was brought into the form required for an eyelet.

I have discovered, by experiment, that it is possible to make eyelets from iron, and that a great improvement in the art results therefrom, from the fact that not only is the cost of the eyelet stock reduced more than one-third, but the eyelet produced from such stock is stronger, lighter, far more durable, and requires less material for its manufacture.

My invention, therefore, consists in an iron eyelet, as a new article of manufacture, and I will now proceed to describe a suitable method of producing the same, it being borne in mind that the invention consists in the article itself.

The qualities required in the stock from which eyelets are produced are as follows, to wit: First, ductility, to adapt it for being drawn into a very thin sheet or strip; secondly, toughness, to prevent the eyelets from bursting when cut and drawn from the strip by the devices employed to form the eyelet; and, thirdly, strength, to prevent the thin walls from breaking down when the eyelet is used, and when it is applied to articles for use.

The ordinary brass and copper eyelets possess these qualities to a certain degreee, but any attempt to make them thin and light results in failure, because the stock can only be worked down to a certain point. This answers well for short eyelets, but prevents the practical production of long ones, because the increase in length carries with it a proportional increase in thickness of metal, and therefore renders the product too clumsy for use, and too expensive in its manufacture.

I am aware that the ductility of annealed iron has been utilized in the arts to a great extent, but this quality in the iron does not furnish a suggestion of my invention, and of course I do not claim it alone, although it forms one of the necessary qualities within certain limits of the eyelet stock. Annealed iron may possess ductility and yet be unfit for eyelet stock. It may be too soft or too brittle. If the former, the eyelet will break down in use. If the latter, it cannot be practically drawn into an eyelet. It is necessary, therefore, that it shall be neither one nor the other, but that it shall possess just the qualities above enumerated. To obtain this result the iron is first prepared by rolling it in strips to the thickness, say, of No. 30, 31, or 32 standard wire-gage, or other suitable thickness, according to the size and thickness of the proposed eyelet. It is then submitted to an annealing process, preferably the following: The metal sheet is first coiled or folded loosely, and placed in a closed iron box or vessel, with layers of fine charcoal or bone-dust filling the spaces between each coil or fold of the metal, and the entire space around the metal filled close and solid with the charcoal or bone-dust. This box is then placed in a furnace, and the whole heated red hot; and then the fire allowed to die out, and the whole to gradually cool, after which the metal is taken from the box and plunged into a bath of muriatic acid, which removes the scale, and leaves the surface of the metal clean and bright. It is then ready to be stripped up into widths suitable for feeding to the eyelet-making machine, wherein it is operated upon to convert it into eyelets by the same tools and appliances which are employed to make eyelets from brass, copper, &c.; or the strips of metal, after being annealed, may be plunged into a bath of blue vitriol or sulphate of copper, by which a thin film or coating of copper is deposited upon the surface of the iron, which coating tends to prevent the abrasion of the dies and punches by which the metal is wrought into eyelets.

I have used the best Norway iron for the manufacture of the eyelets, but any other of good quality, and possessing the necessary ductility and strength, may be employed.

When the iron is annealed by the process above described care should be taken that the folds or coils are separated from each other; otherwise the annealing may not be uniform.

Having thus described my invention, what I claim is—

As a new article of manufacture, an iron eyelet, substantially as described.

THOMAS GARRICK.

Witnesses:

CHARLES SELDEN,
DUTIE WILCOX.